(12) United States Patent
Wiersma et al.

(10) Patent No.: US 11,566,932 B2
(45) Date of Patent: Jan. 31, 2023

(54) SONIC MONITOR SYSTEM FOR A TANK (71) Applicants: Roger E. Wiersma, Pacific, MO (US); Christopher D Gander, Evansville, IN (US); Mike E Ciholas, Newburgh, IN (US)

(72) Inventors: Roger E. Wiersma, Pacific, MO (US); Christopher D Gander, Evansville, IN (US); Mike E Ciholas, Newburgh, IN (US)

(73) Assignee: Husky Corporation, Pacific, MO (US)

( * ) Notice: Subject to any disclaimer, the term of this patent is extended or adjusted under 35 U.S.C. 154(b) by 0 days.

(21) Appl. No.: 14/545,872

(22) Filed: Jul. 1, 2015

(65) Prior Publication Data

US 2016/0011036 A1  Jan. 14, 2016

Related U.S. Application Data

(60) Provisional application No. 61/998,829, filed on Jul. 9, 2014.

(51) Int. Cl.
  *G01F 23/296* (2022.01)
  *G01F 23/2962* (2022.01)

(52) U.S. Cl.
  CPC ........ *G01F 23/2962* (2013.01); *G01F 23/296* (2013.01)

(58) Field of Classification Search
  CPC .................................................. G01F 23/296
  USPC ....................................................... 73/290 V
  See application file for complete search history.

(56) References Cited

U.S. PATENT DOCUMENTS

| 4,805,453 | A | | 2/1989 | Haynes | |
|---|---|---|---|---|---|
| 4,928,525 | A | | 5/1990 | Aderholt et al. | |
| D350,297 | S | | 9/1994 | Weisel | |
| D352,010 | S | | 11/1994 | Curbbun | |
| 5,363,341 | A | * | 11/1994 | Schwald | G01F 23/2968 181/123 |
| D367,915 | S | | 3/1996 | Daugherty | |
| 5,546,005 | A | | 8/1996 | Rauchwerger | |
| 5,550,790 | A | * | 8/1996 | Velamoor | H04R 17/00 310/336 |
| 5,553,479 | A | | 9/1996 | Rauchwerger | |
| 5,644,299 | A | * | 7/1997 | Cruickshank | G01F 23/2961 324/76.49 |
| 5,822,274 | A | | 10/1998 | Haynie et al. | |
| 5,895,848 | A | | 4/1999 | Wilson et al. | |
| 6,347,187 | B1 | | 4/2002 | Knight et al. | |
| 6,539,819 | B1 | * | 4/2003 | Dreyer | G01F 23/2967 73/431 |
| 7,098,669 | B2 | | 8/2006 | Carter | |
| 7,277,020 | B2 | * | 10/2007 | McCarthy | G01F 23/2962 340/621 |

(Continued)

*Primary Examiner* — Alexander A Mercado
(74) *Attorney, Agent, or Firm* — Paul M. Denk (57) ABSTRACT

A sonic monitor system for a tank is disclosed in which the system comprises a remote tank sensor device for installation in a bung opening of a storage tank for determining a level of fluid within the storage tank and for generating a signal indicative of the level of fluid within the storage tank, and a receiver device for receiving the signal indicative of the level of fluid within the storage tank, the receiver device having a display and a siren with the receiver device actuating the siren when the receiver device determines that the level of fluid within the tank is at a predetermined level.

4 Claims, 5 Drawing Sheets

(56) References Cited

U.S. PATENT DOCUMENTS

| | | | | |
|---|---|---|---|---|
| 7,287,425 B2* | 10/2007 | Lagergren | ........... | G01F 23/2962 |
| | | | | 73/290 V |
| 7,562,570 B2* | 7/2009 | Peters | ................ | G01F 25/0061 |
| | | | | 73/290 V |
| 7,833,162 B2* | 11/2010 | Hasegawa | ................ | A61B 8/12 |
| | | | | 600/459 |
| 7,884,755 B2* | 2/2011 | Fehrenbach | .......... | G01F 23/284 |
| | | | | 342/118 |
| 8,091,579 B2* | 1/2012 | Sintes | ................ | G01F 23/2962 |
| | | | | 137/386 |
| 8,104,341 B2* | 1/2012 | Lagergren | ................ | G01D 5/48 |
| | | | | 73/290 V |
| 8,171,786 B2 | 5/2012 | Burris | | |
| 2003/0121325 A1* | 7/2003 | Ku | ................ | G01F 23/263 |
| | | | | 73/304 C |
| 2006/0118065 A1* | 6/2006 | Bassett | ................ | F23G 5/46 |
| | | | | 123/3 |
| 2006/0169056 A1* | 8/2006 | Dockendorff | ....... | G01F 23/2965 |
| | | | | 73/861.23 |
| 2009/0217753 A1* | 9/2009 | Burris | ................ | G01F 23/2962 |
| | | | | 73/290 V |
| 2011/0301884 A1 | 12/2011 | Denby et al. | | |
| 2013/0220012 A1* | 8/2013 | Knowles | ............ | G01F 23/2967 |
| | | | | 73/292 |
| 2013/0233070 A1* | 9/2013 | Bianco | ................ | G01F 23/296 |
| | | | | 73/290 V |
| 2015/0177045 A1* | 6/2015 | Cobianu | ............ | G01F 23/2968 |
| | | | | 367/99 |

\* cited by examiner

SONIC MONITOR SYSTEM FOR A TANK

CROSS REFERENCE TO RELATED APPLICATION

This nonprovisional patent application claims priority to the provisional application having Ser. No. 61/998,829, filed on Jul. 9, 2014.

FIELD OF THE DISCLOSURE

This disclosure generally relates to monitoring systems, and more particularly to a sonic monitor for determining a level of a fluid within a storage tank.

BACKGROUND

Storage tanks are used to store various fluids such as oil, waste oil, diesel fuel, antifreeze, and other fluids having a low flash point. These fluids are stored to be used at automotive repair facilities for various purposes. For example, motor oil is used during an engine oil change and antifreeze is used to refill a radiator. It is also possible that waste oil may be collected and used to provide fuel to a generator or a heater. The storage tank may have various threaded openings in the top of the tank. One of the openings may be a 2 inch diameter bung hole opening that is used to fill or empty the tank. Another one of the openings may be a ¾ inch diameter bung hole opening used for ventilation of the contents of the tank. Over time, the contents of the storage tank are emptied and it is important to know when the storage tank has reached a low level condition to refill the tank. It is also desirable to know when the tank has been filled to an upper level condition to shutoff a pump device that is pumping fluid into the tank. It is extremely important to avoid an overflow condition where fluid could exit out of the tank and contaminant any surrounding area. Cleaning up spilled fluid such as waste oil can be expensive and should be avoided.

In order to determine the level of the contents within the storage tank, various gauges or devices have been used. For example, a float device may be inserted into the tank to determine the level of liquid contents. A stick gauge may also be inserted into the tank to determine the level of the contents within the tank. However, such gauges do not provide any warning or indication as to when the contents of the tank reach a critical low or high level. Further, these devices do not assist in avoiding an overflow condition.

The present disclosure is designed to obviate and overcome many of the disadvantages and shortcomings experienced with prior devices for determining a level of liquid in a fluid or liquid storage tank. Moreover, the present disclosure is related to a sonic monitor system for a tank that can determine when the tank will be empty, full, or at an overflow condition.

Various prior patents have been published showing storage tank monitoring devices, even those that may be of sonic operation.

For example, U.S. Pat. No. 8,171,786 to Burres shows a fuel inventory monitoring system. It is an ultrasonic based or radar-based apparatus.

U.S. Pat. No. 6,374,187, which discloses an underground storage tank monitoring system and method. It operates off of a special micropower impulse radar probe.

U.S. Pat. No. 4,928,525, shows a sonic tank inventory control system and method.

U.S. Pat. No. 4,805,453, shows another tank sonic gauging system and method.

U.S. published application No. 2011/0301884, discloses another storage tank monitoring apparatus. It converts a compositive measurement into a signal that can detect both the storage substance in the tank, in addition to a second substance that may have entered into the same storage tank.

U.S. Pat. No. 5,546,005, discloses a guarded capacitance probe in related measurement circuit for determine a liquid level within a system.

U.S. Pat. No. 5,553,479, shows another threshold level of calibration method and apparatus.

U.S. Pat. No. 5,822,274, discloses a method and apparatus for acoustically measuring the level of liquid in a tank.

U.S. Pat. No. 5,895,848, discloses an apparatus and method for level sensing in a container. It utilizes a tuning fork and various circuitry for providing a liquid level sensing apparatus.

U.S. Pat. No. 7,098,669, shows another depth determining system.

A series of U.S. design patents, U.S. Pat. Nos. DES. 350,295, DES. 352,010, and DES. 367,915, show various types of liquid level sensors and adapters for use in conjunction there with.

These are examples of known prior art relating to the technology of this current disclosure.

SUMMARY OF THE DISCLOSURE

The present disclosure is a sonic monitor system for a tank of any type and size which comprises a remote tank sensor device for installation in a bung opening of a storage tank for determining a level of fluid within the storage tank and for generating a signal indicative of the level of fluid within the storage tank, and a receiver device for receiving the signal indicative of the level of fluid within the storage tank, the receiver device having a display and a siren with the receiver device actuating the siren when the receiver device determines that the level of fluid within the tank is at a predetermined level.

In another form of the present disclosure, a sonic monitor system for a tank is disclosed which comprises a first remote tank sensor device for installation in a bung or other opening of a first storage tank for determining a level of fluid within the first storage tank and for generating a first signal indicative of the level of fluid within the first storage tank, a second remote tank sensor device for installation in a bung or other opening of a second storage tank for determining a level of fluid within the second storage tank and for generating a second signal indicative of the level of fluid within the second storage tank, and a receiver device for receiving the first signal indicative of the level of fluid within the first storage tank and the second signal indicative of the level of fluid within the second storage tank, the receiver device having a display and a siren or alarm with the receiver device actuating the siren when the receiver device determines that the level of fluid within the first tank is at a predetermined level or the level of fluid within the second tank is at a predetermined level.

In yet another form of the present disclosure, a sonic monitor system for a tank is disclosed which comprises a first remote tank sensor device for installation in a bung opening of a first storage tank for determining a level of fluid within the first storage tank and for generating a first signal indicative of the level of fluid within the first storage tank, a second remote tank sensor device for installation in a bung opening of a second storage tank for determining a level of fluid within the second storage tank and for generating a second signal indicative of the level of fluid within the second storage tank, and a receiver device for receiving the first signal indicative of the level of fluid within the first storage tank and the second signal indicative of the level of fluid within the second storage tank, the receiver device having a display and a siren with the receiver device actuating the siren or other alarm when the receiver device determines that the level of fluid within the first tank is at a predetermined level or the level of fluid within the second tank is at a predetermined level, and the receiver device being capable of determining whether the first remote tank sensor device is active and the second remote sensor device is active In light of the foregoing comments, it will be recognized that the present disclosure provides a sonic monitor system for a tank that can monitor an empty condition, a full condition, or even an overflow condition of a storage tank.

The present disclosure provides a sonic monitor system for a tank that can be easily employed with highly reliable results to prevent spilling of gasoline or other liquid from a storage tank.

The present disclosure provides a sonic monitor system for a tank that can determine critical levels of a fluid stored within a storage tank to allow for refilling of the storage tank before storage tank is emptied.

The present disclosure further provides a sonic monitor system for a tank that provides an audible alarm when an overflow condition has been detected.

The present disclosure provides a sonic monitor system for a tank that requires only a few tools for installation in a tank or removal from a tank.

The present disclosure provides a sonic monitor system for a tank that is easy to program to detect various operating conditions.

The present disclosure is further directed to a sonic monitor system for a tank that does not require an existing storage tank to be retrofitted for use of the sonic monitor system for a tank of the present disclosure.

The present disclosure also provides a sonic monitor system for a tank that can be constructed of readily available components for easy installation into a storage tank.

The present disclosure provides a sonic monitor system for a tank that automatically monitors a level in a storage tank for optimum operation of the storage tank.

The present disclosure is directed to a sonic monitor system for a tank that is capable of monitoring a number of different storage tanks to determine the level in each individual tank.

These and other advantages of the present disclosure will become apparent to those skilled in the art after considering the following detailed specification in conjunction with the accompanying drawings.

DETAILED DESCRIPTION OF PREFERRED EMBODIMENTS

Figure 1:
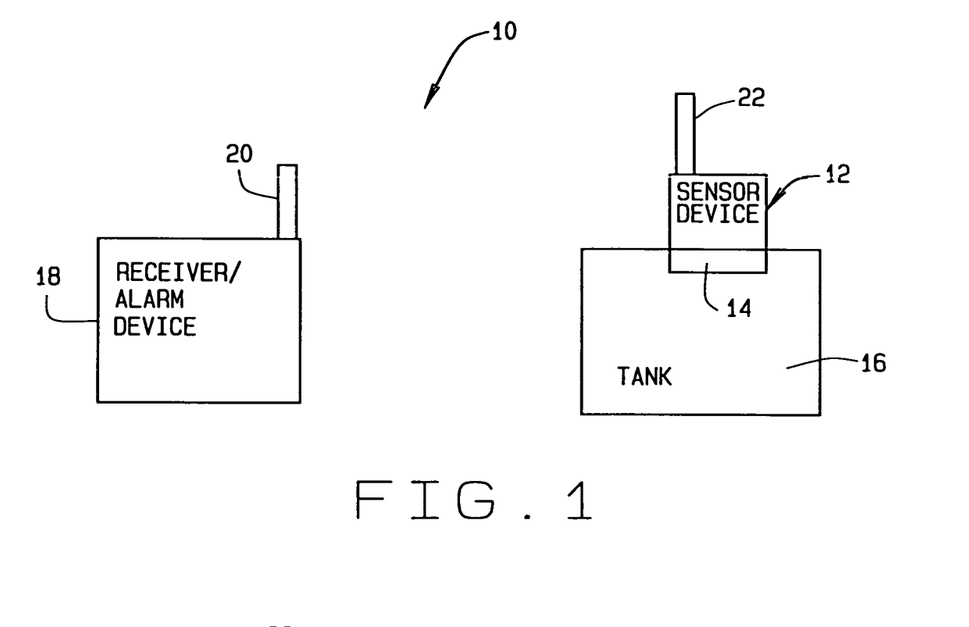
FIG. 1 is a block diagram of a sonic monitor system for a tank constructed according to the present disclosure.

Referring now to the drawings, wherein like numbers refer to like items, number 10 identifies a preferred embodiment of a sonic monitor system for a tank constructed according to the present disclosure. With reference now to FIG. 1, the sonic monitor system for a tank 10 is shown comprising a remote tank sensor device 12 being installed in a bung or other opening 14 of a storage tank 16 and a receiver device 18. The receiver device 18 has an antenna 20 for transmitting and receiving signals to and from the remote tank sensor device 12. The remote tank sensor device 12 also has an antenna 22 for transmitting and receiving signals to and from the receiver device 18. The remote tank sensor device 12, as will be explained in detail herein, is capable of detecting or monitoring a level of fluid or liquid being stored within the tank 16. For example, the remote tank sensor device 12 may continuously or automatically send an ultrasonic signal into the tank 16 to gauge or determine the level of fluid or liquid in the tank 16. Although not shown in detail, the remote tank sensor device 12 may be powered by an AC/DC adapter (12V out, 1.0 A rating). The remote tank sensor device 12 is capable of transmitting data related to the tank fluid depth measured by the sensor device 12 in the 2.4 GHz to 2.48 GHz range or other authorized frequencies. This data or radio signal is transmitted to the receiver device 18. The receiver device 18 may also be powered by an AC/DC adapter (12V out, 1.0 A rating). The receiver device 18 is capable of receiving and transmitting a signal in the 2.4 GHz to 2.48 GHz range, or others. The receiver device 18 may send an acknowledged signal back to the tank sensor device 12. Both the device 12 and the receiver 18 have the ability to select from three channels to ensure communication between the device 12 and the receiver 18.

Figure 2:
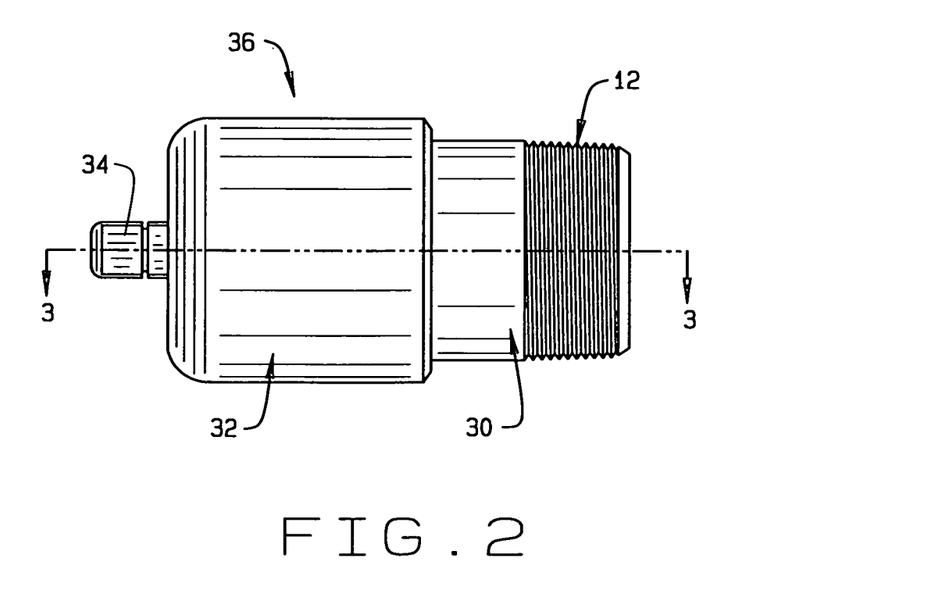
FIG. 2 is a front view of a tank sensor device constructed according to the present disclosure.

FIG. 2 is a front view of the remote tank sensor device 12. The tank sensor device 12 has a threaded nipple 30 that is adapted to be threaded into the bung opening 14 (FIG. 1) associated with the storage tank 16 (FIG. 1). A cap 32 is threaded onto the nipple 30. The cap 32 also has a cord grip 34 which is used to house an electrical cord (not shown) for provided power to the device 12. The nipple 30, the cap 32, and the cord grip 34 may be constructed from any suitable material. When the nipple 30, the cap 32, and the cord grip 34 are connected together they form a unitary housing construction 36. By way of example only, the sensor device 12 is available from MaxBotix, Inc, of Brainerd, Minn., 56401, and identified by the model name Range Finder.

Figure 3:
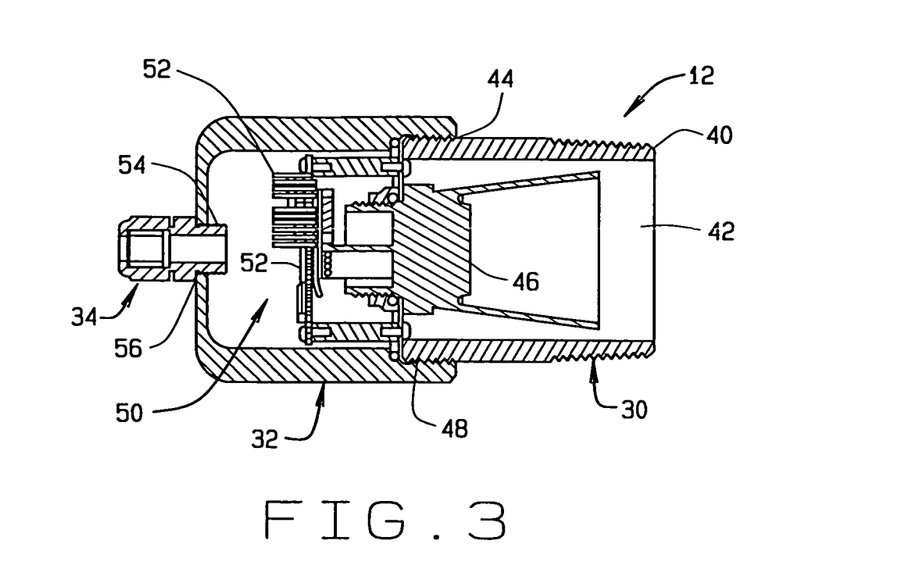
FIG. 3 is a cross-sectional view of the tank sensor device shown in FIG. 2 taken along the plane of line 3-3.

With reference now to FIG. 3, a cross-sectional view of the remote tank sensor device 12 is shown. The tank sensor device 12 comprises the nipple 30 having a lower threaded end 40, a hollow center section 42, and an upper threaded end 44. A sonar range finder device 46 is positioned within the hollow center section 42 of the device 12. The sonar range finder device 46 is capable of measuring tank depths from 8" to 300" (20 to 760 cm) high within the storage tank 16. The cap 32 has a lower threaded end 48 for receiving the upper threaded end 44 of the nipple 30. A control board 50 is mounted within the cap 32 and includes circuitry 52 for operating the sonar range finder device 46 and for sending and receiving various signals. For example, the antenna 22 may be part of the circuitry 52. The cord grip 34 has a threaded end 54 that is threaded into an opening 56 of the cap 32. Although not shown, an electrical cord may be inserted through the cord grip 34 into the cap 32 to provide power to the control board 50.

Figure 4:
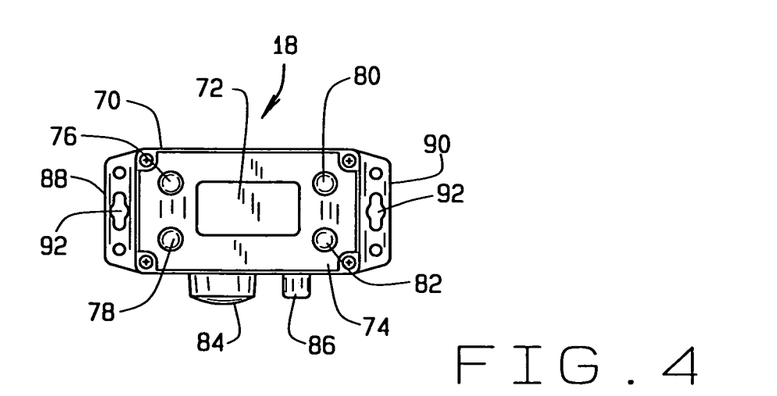
FIG. 4 is a front view of a receiver device constructed according to the present disclosure.

FIG. 4 illustrates a front view of the receiver device 18. The receiver device 18 has an enclosure 70, a display 72, a keypad 74 having a number of buttons 76, 78, 80, and 82, a siren 84, and a cord grip 86. The display 72 is used to display various operation menus and the status of the sonic monitor system 10. The buttons 76, 78, 80, and 82 allow information to be inputted into the device 18. The button 76 may be designated as the "OK" button, the button 78 may be designated as the "EXIT" button, the button 80 may be designated as the "UP" button, and the button 82 may be designated as the "DOWN" button. For example, the button 80 allows for scrolling up through various operation menus displayed in the display 72 of the device 18. The display 72 may display the level of the storage tank 16 in English or metric units. The siren 78 is an audible alarm for alerting a specific condition of the monitor 10. For example, if a low level condition in the storage tank 16 is detected by the device 12, then the siren 84 will be activated. One or more of the buttons 76, 78, 80, and 82 may be pressed to silence the siren 84. The cord grip 86 allows an electrical cord to be inserted therein for providing power to the receiver device 18. The enclosure 70 also has a pair of tabs 88 and 90 each having screw holes 92. The tabs 88 and 90 are used to mount the device 18 to a suitable structure.

Figure 5:
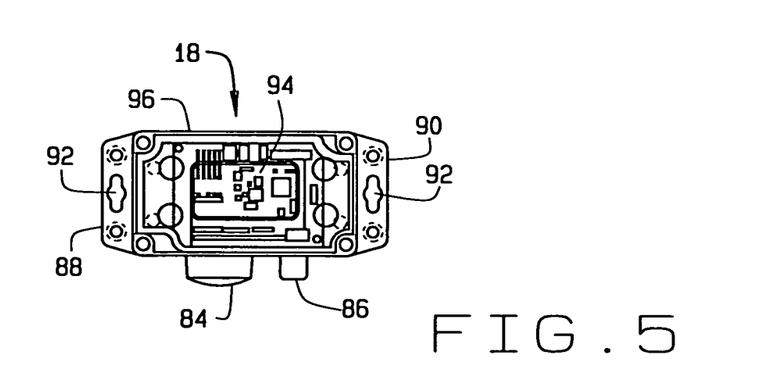
FIG. 5 is a front view of the receiver device shown in FIG. 4 with its keypad removed to view a circuit board installed in the receiver device.

Referring now to FIG. 5, an interior view of the receiver device 18 is shown with the display 72 and the keypad 74 being removed to view the interior of the device 18. The device 18 has a control board 94 having circuitry 96 for operating the device 18 and also for sending and receiving signals. The antenna 20 may also be part of the circuitry 96. The siren 84 is also connected to the control board 94 and the circuitry 96 controls operation of the siren 84. Although not shown in detail, the circuitry 96 may include integrated circuits such as a microcontroller, a microprocessor, an ASSP (application specific standard products) chip, or an ASIC (application specific integrated circuit) chip that has stored therein various programs for operating or controlling the monitor 10. Other components that may be included as part of the circuitry 96 may include memory chips, such as RAM, ROM, or EEPROM chips. The enclosure 70 is also shown having the siren 84, the cord grip 86, the pair of tabs 88 and 90, and the screw holes 92.

Figure 6:
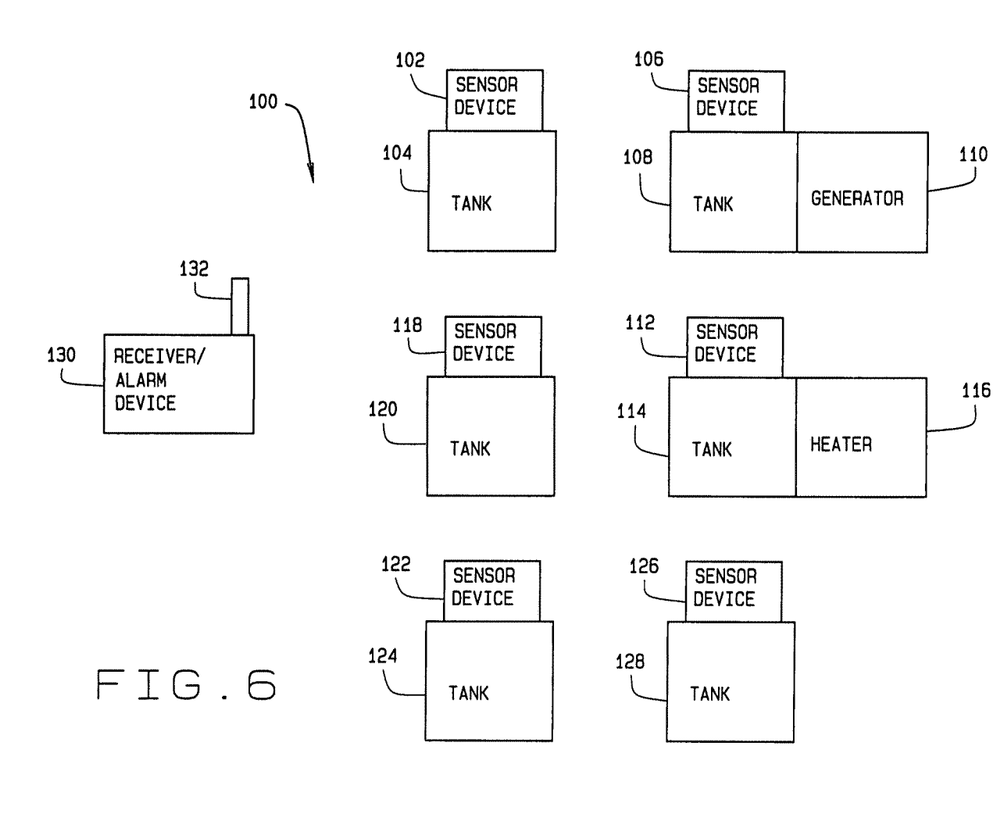
FIG. 6 is a block diagram of another embodiment of a sonic monitor system for a number of tanks constructed according to the present disclosure.

FIG. 6 illustrates another embodiment of a sonic monitor system for a tank 100 constructed according to the present disclosure. The monitor 100 is shown comprising a first remote tank sensor device 102 being installed in a storage tank 104, a second remote tank sensor device 106 being installed in a storage tank 108 that is connected to a generator 110, a third remote tank sensor device 112 being installed in a storage tank 114 that is connected to a heater 116, a fourth remote tank sensor device 118 being installed in a storage tank 120, a fifth remote tank sensor device 122 being installed in a storage tank 124, a sixth remote tank sensor device 126 being installed in a storage tank 128, and a receiver device 130 having an antenna 132 that is capable of monitoring all of the remote tank sensor devices 102, 106, 112, 118, 122, and 126. As can be appreciated, it may be important to have the generator 110 running all the time to provide power to a critical installation. If the generator 110 is run off of gasoline, which is stored in the storage tank 108, then it is imperative to know when the gasoline in the storage tank 108 reaches a certain low level to be able to refill the storage tank 108 to be certain that fuel is always available to the generator 110. The system 100 is able to provide monitoring of the tank 108 to prevent the gasoline in the tank 108 from being emptied. Although not shown, each of the remote tank sensor devices 102, 106, 112, 118, 122, and 126 has an antenna for transmitting and receiving signals. The remote tank sensor devices 102, 106, 112, 118, 122, and 126 are capable of detecting or monitoring a level of fluid or liquid being stored within each of the tanks 104, 108, 114, 120, 124, and 128, respectively. For example, the remote tank sensor device 102 may continuously or automatically send an ultrasonic signal into the tank 104 to gauge or determine the level of fluid or liquid in the tank 104. Once the level within the tank 104 has been detected, a signal is sent to the receiver device 130. The remote tank sensor devices 102, 106, 112, 118, 122, and 126 are each capable of transmitting data in the 2.4 GHz to 2.48 GHz range, or other ranges. This data or radio signal is transmitted to the receiver device 130. The receiver device 130 is also capable of receiving and transmitting a signal in the, for example, 2.4 GHz to 2.48 GHz range. The receiver device 130 may send an acknowledge signal back to each of the tank sensor devices 102, 106, 112, 118, 122, and 126. Each of the remote tank sensor devices 102, 106, 112, 118, 122, and 126 and the receiver 130 have the ability to select from three channels to ensure communication between the device 102, 106, 112; 118, 122, and 126 and the receiver 130. The remote tank sensor devices 102, 106, 112, 118, 122, and 126 are the same as the device 12. The receiver device 130 is the same as the receiver device 18.

The remote tank sensor devices 12, 102, 106, 112, 118, 122, and 126 may be installed into the 2" NPT tank bung by hand tightening. The devices 12, 102, 106, 112, 118, 122, and 126 must be mounted within 2 degrees from perpendicular to the surface of the fluid stored within the storage tank. The devices 12, 102, 106, 112, 118, 122, and 126 may not read properly if tilted more than 2 degrees from the surface of the tank liquid.

The receiver devices 18 and 130 may be programmed in the following manner. The devices 18 or 130 will request a user to choose units will be displayed. Pressing the button 76 will select English units and pressing the button 78 will select metric units. The devices 18 or 130 will recognize an operating sensor 12, 102, 106, 112, 118, 122, or 126 and request to that it be added to the receiver device 18 or 130. Pressing the button 76 will add it and pressing the button 78 will not add it. The identification or name of a particular tank, such as storage tanks 16, 104, 108, 114, 120, 124, or 128 can be inputted into the receiver devices 18 or 130. Up to ten characters consisting of letters, numbers, and spaces can be selected to name a particular tank. Once the name or identification of a particular tank has been inputted, the tank depth may be inputted. A depth from 8" to 300" (20 cm to 760 cm) may be selected. An audible alarm type may also be selected. For example, a high alarm, a low alarm, or both high and low alarms may be selected. The receiver devices 18 or 130 will display tank label, tank level, and percentage. The receiver devices 18 or 130 will continue to search for operating tank sensor signals and ask to add to the display 72 until all sensors are added or the tank sensor search mode is turned off.

The receiving devices 18 and 130 are capable of being put into an alarm mode. The following alarm modes are possible under the following conditions. If the tank depth is greater than 78 inches (199 cm) and the fluid level percentage is greater than 90 or less than 11, then the siren 84 will sound and the display 72 will flash red. If the tank depth is greater than 78 inches (199 cm) and the fluid level percentage is greater than 87 or less than 13, then the display 72 will flash red at 30 second intervals. If the tank depth is less than 79 inches (200 cm) and the fluid level percentage is greater than 79 or less than 11, then the siren 84 will sound and the display 72 will flash red. If the tank depth is less than 79 inches (200 cm) and the fluid level percentage is greater than 72 or less than 13, then the display 72 will flash red at 30 second intervals. To silence the siren 84, the button 76 is pressed and the siren 84 will be shut off. The display 72 will continue to flash red until the tank level is within the above ranges.

The various settings for the sonic monitor system 10 or 100 may be changed. For example, the tank information may be changed and the units, English or metric, may be changed. The wireless channel upon which data is transmitted or received may also be changed. In particular, the receiver device and the sensor devices may use one of three channels. The receiver device can have programmed therein which channel, 0, 1, or 2, that will be used to transmit and receive data or radio signals between the receiver device and the sensor devices.

If power is interrupted to one of the remote tank sensor devices 12, 102, 106, 112, 118, 122, or 126, then the receiver devices 18 or 130 will search ten seconds for the sensor signal. If the receiver devices 18 or 130 cannot find the sensor device, then the display 72 will display "???" to indicate the loss of a signal. The display 72 will also flash blue at 30 second intervals. When power is restored, the sensor will re-evaluate the tank level, transmit a signal to the receiver device 18 or 130, and display updated tank level data. If the receiver devices 18 or 130 have a power interruption, then the display 72 will become blank. Once power is restored, the receiver device 18 or 130 will ask to recall stored data. The button 76 is pressed to recall stored data or the button 78 is pressed not to recall stored data. Pressing the button 78 will erase all tank data which will have to be reentered. Also, if no buttons are pressed then the receiver device will automatically retrieve stored tank level data.

If desired, the display 72 may be illuminated by pressing either the button 80 or the button 82. The display 72 will be illuminated for 10 seconds.

Figure 7:
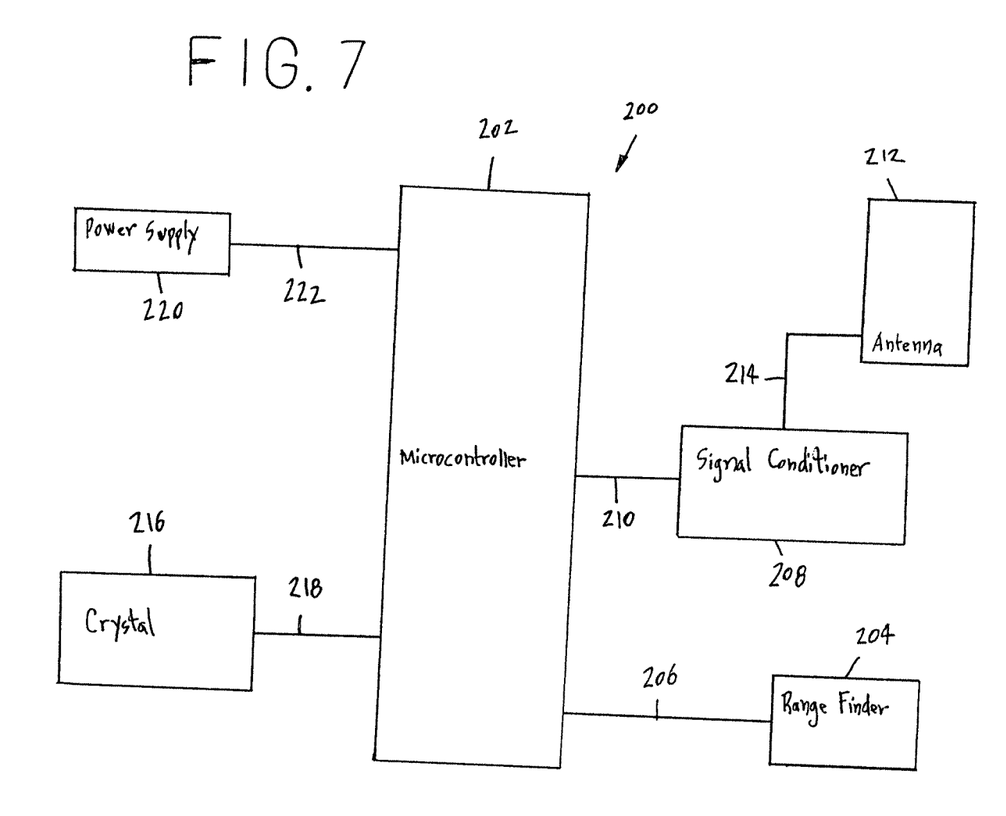
FIG. 7 is a block diagram for a tank sensor device of the sonic monitor system for a tank constructed according to the present disclosure.

FIG. 7 is a block diagram of a tank sensor device 200 which is the same as the tank sensor devices 12, 102, 106, 112, 118, 122, or 126. The tank sensor device 200 has a microcontroller 202 having a sonar range finder sensor device 204 connected to the microcontroller 202 by a connection 206. Although a single connection 206 is shown, it is contemplated that the connection 206, and any other connection referenced herein, may consist of one or more wires, as is well known. By way of example only, a suitable microcontroller 202 may be an ATmega64RFR2-ZU manufactured by Atmel, which is an eight bit microcontroller. As has been previously indicated, an example of the sonar ranger finder sensor device is an MB7092 XL ranger finder made by MaxBotix. A signal conditioning device 208 is connected between the microcontroller 202 via a connection 210 and an antenna device 212 by a connection 214. An example of the signal conditioning device 208 is a Wurth Electronics 748421245 signal conditioning device. Also, an example of the antenna 212 is a Pulse WLAN W006 dual band ceramic chip device. An oscillator circuit 216 is connected to the microcontroller 202 by a connection 218. The oscillator circuit 216 provides a 16 MHz clock signal to the microcontroller 202. An example of the oscillator circuit 216 is an ECS-160-8-36 CKM made by ECS. A power supply 220 is connected to the microcontroller 202 by a connection 222. The power supply 220 provides 3 volts to power the microcontroller 202. As can be appreciated, the tank sensor device 200 is capable of transmitting a signal indicative of the level of fluid in a storage tank. The sensor device 200 measures the tank fluid depth by use of the sonar range finder sensor device 204. The device 204 sends a signal over the connection 206 to the microcontroller 202 and a software program within the microcontroller 202 will initiate a signal to be transmitted through the signal conditioning device 208 and the antenna 212.

Figure 8:
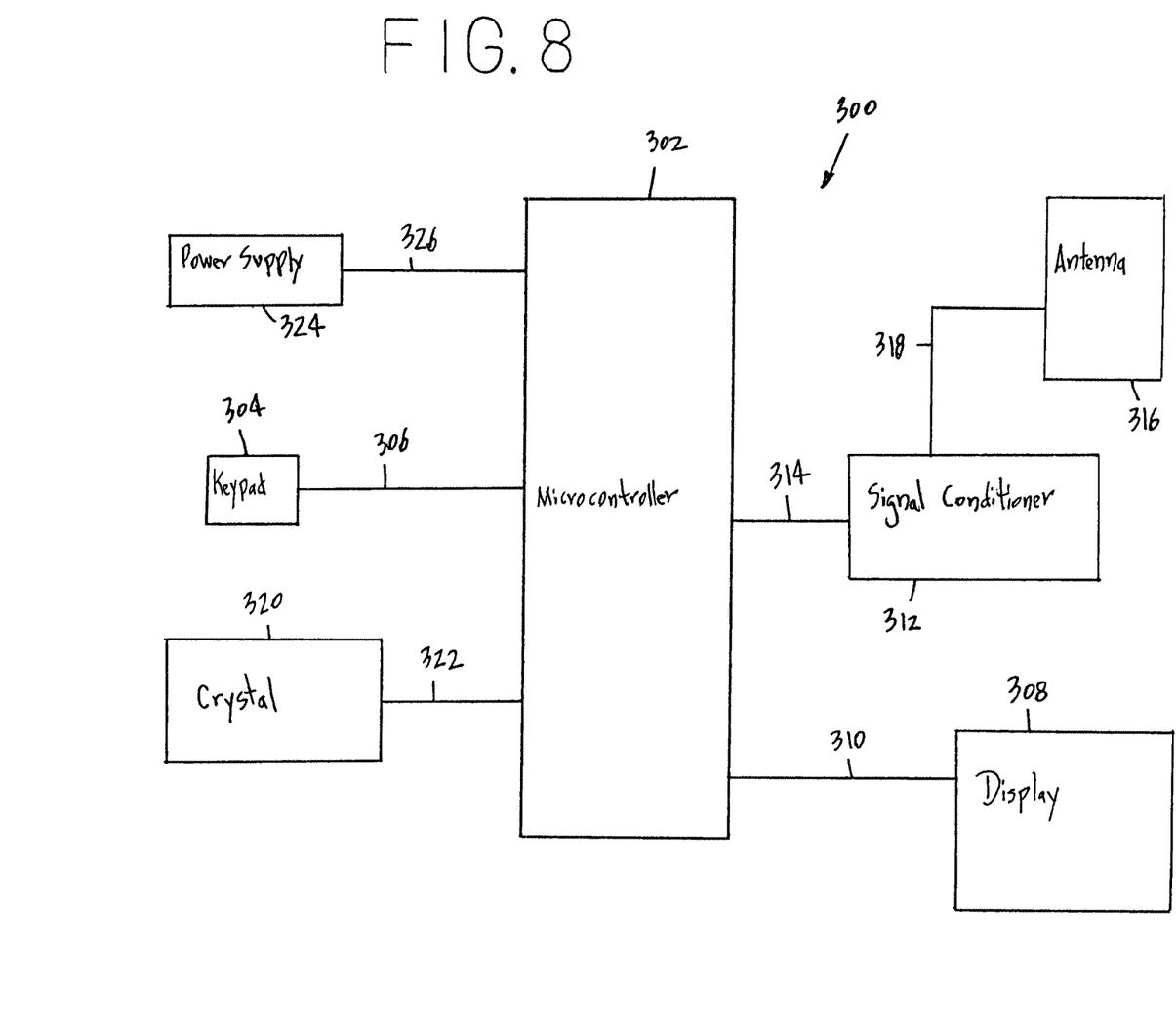
FIG. 8 is a block diagram for a receiver device of the sonic monitor system for a tank constructed according to the present disclosure.

Referring now in particular to FIG. 8, a block diagram of a receiver device 300 is shown. The receiver device 300 is the same as the receiver device 18 or 130. The receiver device 300 has a microcontroller 302 having a keypad 304 connected to the microcontroller 302 by a connection 306 and a display device 308 connected to the microcontroller 302 via a connection 310. Again, by way of example only, a suitable microcontroller 302 may be an ATmega64RFR2-ZU manufactured by Atmel. An example of the display device 308 is a Displaytech S64128K FC BW-RGB LCD module graphic 128 by 64 which is a monochrome display have red, green, and blue backlight. A signal conditioning device 312 is connected between the microcontroller 302 via a connection 314 and an antenna device 316 by a connection 318. An example of the signal conditioning device 312 is a Wurth Electronics 748421245 signal conditioning device. Also, an example of the antenna 316 is a Pulse WLAN W006 dual band ceramic chip device. An oscillator circuit 320 is connected to the microcontroller 302 by a connection 322. The oscillator circuit 320 provides a 16 MHz clock signal to the microcontroller 302. An example of the oscillator circuit 320 is an ECS-160-8-36 CKM made by ECS. A power supply 324 is connected to the microcontroller 302 by a connection 326. The power supply 324 provides 3 volts to power the microcontroller 302. The device 300 is capable of transmitting and receiving various signals from, for example, the circuit 200 (FIG. 7). For example, a signal indicative of a level of fluid in a storage tank may be received by the device 300 to determine if an alarm needs to be initiated or if the display 308 needs to be operated. Also, although not shown in any detail, a software program may be loaded into the microcontroller 302 for controlling operation of the device 300. For example, the software program is capable of receiving signals from the keypad 304 to display various menus in the display 308. Further, the microcontroller 302 is capable of sending a signal to the device 200 to determine if the device 200 is active. It may be useful to be able to determine if there is a problem with the device 200 so as to activate an alarm or display an indication that there is a problem with the device 200. In particular, if the device 200 is monitoring a critical storage tank then it is imperative to know that the device 200 is functioning correctly. The microcontroller 302 may be programmed to periodically send a signal to the device 200 to determine the status of the device 200. The device 200 may be programmed to send a signal back to the device 300 that the device 200 is functioning properly or that the device 200 is active.

From all that has been said, it will be clear that there has thus been shown and described herein a sonic monitor system for a tank. It will become apparent to those skilled in the art, however, that many changes, modifications, variations, and other uses and applications of the subject sonic monitor system for a tank are possible and contemplated. All changes, modifications, variations, and other uses and applications which do not depart from the spirit and scope of the disclosure are deemed to be covered by the disclosure, which is limited only by the claims which follow.

We claim:

1. A sonic monitor system for a plurality of storage tanks to separately determine a level of fuel and where there is a low level of fuel located in each storage tank, comprising:
   a plurality of remote tank sensor devices, each tank sensor device having a sonic range sensor, one of each tank sensor device for installation in a bung or other opening of each storage tank for determining the level of fuel within its associated storage tank and for generating a signal indicative of the level of fuel within its associated storage tank, said tank sensor devices in operation determining where an associated storage tank has attained a low level condition of contained fuel to initiate a refill of the tank to a full level fuel condition;
   each said remote tank sensor device having a hollow center section forming a housing and having a lower threaded end and an upper threaded end, the lower threaded end of the hollow center section of each remote tank sensor is threaded into the bung of its associated storage tank for directing the sonic range finder sensor into the storage tank, a cap having a lower threaded end for receiving the upper threaded end of the hollow center section, the cap having an upper end having an opening, a circuit board including circuitry positioned within the cap, a microcontroller included in said circuitry, the sonic range finder sensor connected to the circuit board and the sonic range finder sensor positioned within the hollow center section of each sensor device, the circuitry having a signal conditioner device for transmitting the signal indicative of the level of fuel within the associated storage tank generated by the remote tank sensor device, each remote tank sensor device is capable of transmitting the signal indicative of the level of fuel within the associated storage tank and in a frequency range of approximately 2.4 GHz to 2.48 GHz frequency range, an oscillator circuit connected to said microcontroller for generating a clock signal for the microcontroller, and a power supply connected to the microcontroller for providing electric charge operations for each of the said remote tank sensor devices, a transmitter antennae connected to the signal conditioner device and provided for transmitting the signal indicative of the level of fuel within the associated storage tank;
   a cord grip having a threaded end that is threaded into the opening of the cap;
   said cap capable of removal from the hollow center section to provide for access to said circuit board and its said circuitry, wherein said cap is removable from said housing through disengagement of the said upper threaded end of said housing and said lower threaded end of said cap to permit mounting and dismounting of said circuitry and said sonic range finder within said cap and said housing, respectively, and wherein said cord grip is secured to said cap using a separate threaded connection to said cap;
   a receiver device for receiving the signals from each storage tank sensor device indicative of the level of fuel within each storage tank, the receiver device having a display and an alarm, with the receiver device actuating said alarm when the receiver device determines, based on a received signal from the sensor device that corresponds to the level of fuel within the storage tank, that the level of fuel within the specific tank is at a predetermined level;
   said receiver device including further circuitry incorporating a receiver microcontroller, said receiver microcontroller connected to the display for displaying data processed in said receiver microcontroller, said receiver microcontroller having a signal conditioner circuitry, said receiver device having a receiver antenna, said receiver microcontroller connected to said receiver antenna and set up for receiving and processing the signal indicative of the level of fuel within the specific storage tank received by said receiver antenna, an oscillator circuit connecting to said receiver microcontroller, and a power supply connected to the receiver microcontroller for providing electrical charge for operations of said receiver device and to provide for operations of the display and for actuating the said alarm;
   and said receiver device having a keypad connecting to said receiver microcontroller for inputting data to said receiver microcontroller, said receiver device further comprises an enclosure, the keypad having buttons, and a cord grip, all integrated together to provide for operation of the sonic monitor system, wherein the receiver device is capable of being placed in an alarm mode, with the receiver device actuating the alarm when the receiver device determines that the level of fuel within the specific tank is at a predetermined level, and wherein the alarm mode is cancelled by pressing one of the buttons on the keypad;
   one of the storage tanks being connected to a generator for providing fuel to the generator for operation of the generator, and the power supply connected to the tank sensor device microcontroller; and
   said receiver device having said keypad for use for selecting one of the received signals from the plurality of remote tank sensor devices to be processed by said receiver microcontroller to display data regarding the level of fuel in the selected storage tank.

2. The sonic monitor system for the plurality of storage tanks of claim 1 wherein the receiver device and its said alarm is capable of being placed in said alarm mode where the alarm is actuated, and the display flashes a predetermined color.

3. The sonic monitor system for the plurality of storage tanks of claim 1, further comprising a heater connected to one of the storage tanks with the storage tank connected to the heater providing fuel to the heater for operation of the heater.

4. The sonic monitor system for the plurality of storage tanks of claim 1 wherein there are six remote tank sensor devices one each for each storage tank provided in said system.

* * * * *